(12) United States Patent
Balasubramanian et al.

(10) Patent No.: US 9,113,213 B2
(45) Date of Patent: Aug. 18, 2015

(54) SYSTEMS AND METHODS FOR SUPPLEMENTING CONTENT WITH AUDIENCE-REQUESTED INFORMATION

(71) Applicant: Nuance Communications, Inc., Burlington, MA (US)

(72) Inventors: Sundar Balasubramanian, Seattle, WA (US); Michael McSherry, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/749,798

(22) Filed: Jan. 25, 2013

(65) Prior Publication Data

US 2014/0215505 A1 Jul. 31, 2014

(51) Int. Cl.
*H04N 9/16* (2006.01)
*H04N 21/4722* (2011.01)
*H04N 21/422* (2011.01)
*H04N 21/439* (2011.01)

(52) U.S. Cl.
CPC ..... *H04N 21/4722* (2013.01); *H04N 21/42203* (2013.01); *H04N 21/439* (2013.01)

(58) Field of Classification Search
CPC .......................... H04N 21/812; H04N 7/17318
USPC .......................... 725/34, 60–61, 114–116, 93
See application file for complete search history.

(56) References Cited

U.S. PATENT DOCUMENTS

| | | | |
|---|---|---|---|
| 6,282,703 B1 * | 8/2001 | Meth et al. | 717/163 |
| 6,282,713 B1 * | 8/2001 | Kitsukawa et al. | 725/36 |
| 6,751,800 B1 * | 6/2004 | Fukuda et al. | 725/40 |
| 8,099,325 B2 * | 1/2012 | Gangadharpalli et al. | 705/14.49 |
| 8,156,004 B2 * | 4/2012 | Wajihuddin | 705/14.5 |
| 8,204,786 B2 * | 6/2012 | LeBoeuf et al. | 705/14.66 |
| 8,209,171 B2 * | 6/2012 | Abbott et al. | 704/235 |
| 8,458,168 B2 * | 6/2013 | Surendran et al. | 707/722 |
| 8,966,520 B2 * | 2/2015 | Tom et al. | 725/32 |
| 2005/0060742 A1 * | 3/2005 | Riedl et al. | 725/34 |

(Continued)

FOREIGN PATENT DOCUMENTS

| | | | |
|---|---|---|---|
| JP | 2004078876 A | 3/2004 | |
| JP | 2004312093 A | 11/2004 | |

(Continued)

OTHER PUBLICATIONS

U.S. Appl. No. 13/597,017, filed Aug. 28, 2012, Balasubramanian et al.

(Continued)

*Primary Examiner* — Annan Shang
(74) *Attorney, Agent, or Firm* — Perkins Coie LLP

(57) ABSTRACT

A system and method are described for delivering to a member of an audience supplemental information related to presented media content. Media content is associated with media metadata that identifies active content elements in the media content and supported intents associated with those content elements. A member of an audience may submit input related to an active content element. The audience input is compared to media metadata to determine whether supplemental information can be identified that would be appropriate to deliver to the audience member based on that person's input. In some implementations, audience input includes audio data of an audience's spoken input regarding the media content.

20 Claims, 6 Drawing Sheets

(56) References Cited

U.S. PATENT DOCUMENTS

| | | |
|---|---|---|
| 2005/0108011 A1 | 5/2005 | Keough et al. |
| 2005/0278741 A1* | 12/2005 | Robarts et al. .................. 725/46 |
| 2006/0047704 A1 | 3/2006 | Gopalakrishnan |
| 2007/0185816 A1* | 8/2007 | Davis ............................... 705/51 |
| 2008/0021710 A1 | 1/2008 | Ho |
| 2008/0148316 A1 | 6/2008 | Kang et al. |
| 2009/0124272 A1 | 5/2009 | White et al. |
| 2009/0245479 A1 | 10/2009 | Surendran |
| 2009/0254632 A1 | 10/2009 | Kannan et al. |
| 2010/0051560 A1* | 3/2010 | Littman et al. ........... 210/748.14 |
| 2010/0318357 A1 | 12/2010 | Istvan et al. |
| 2011/0125777 A1* | 5/2011 | Begeja et al. ................. 707/769 |
| 2011/0166932 A1 | 7/2011 | Smith et al. |
| 2011/0231261 A1 | 9/2011 | Sattaru et al. |
| 2011/0265117 A1* | 10/2011 | Cha et al. ........................ 725/35 |
| 2012/0022950 A1 | 1/2012 | Gilbert et al. |
| 2012/0109759 A1 | 5/2012 | Oren et al. |
| 2013/0046544 A1 | 2/2013 | Kay et al. |
| 2013/0158980 A1* | 6/2013 | Landry et al. ..................... 704/9 |

FOREIGN PATENT DOCUMENTS

| | | |
|---|---|---|
| KR | 1020000072128 | 12/2000 |
| KR | 1020090085995 | 8/2009 |
| KR | 20100050208 | 5/2010 |

OTHER PUBLICATIONS

International Search Report and Written Opinion for International Application PCT/US2013/057166; Applicant Nuance Communications, Inc.; Mail Date Dec. 12, 2013; 13 pages.

International Search Report and Written Opinion for International Application PCT/US2014/012613; Applicant Nuance Communications, Inc.; Mail Date May 9, 2014; pp. 12.

* cited by examiner

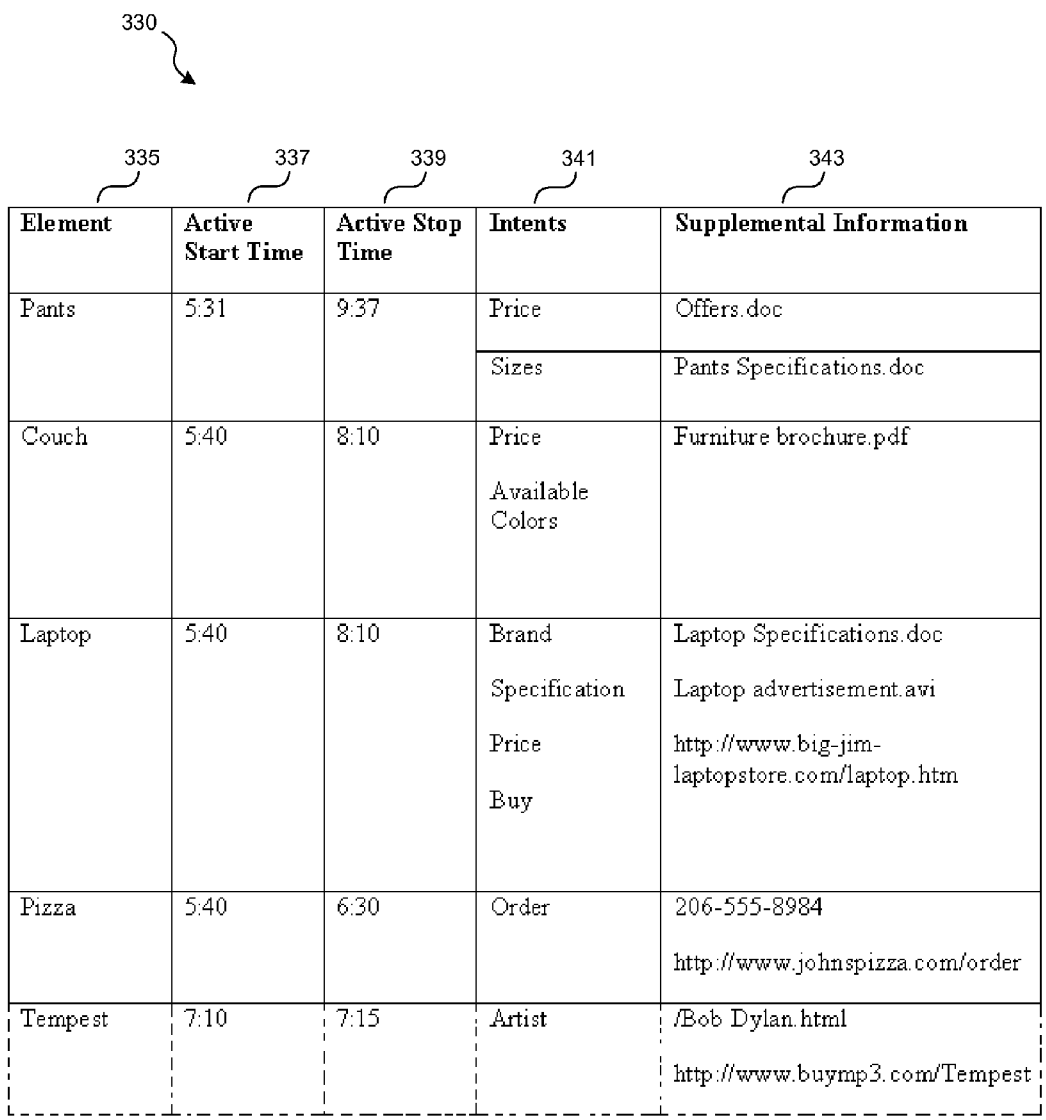

| Element | Active Start Time | Active Stop Time | Intents | Supplemental Information |
|---|---|---|---|---|
| Pants | 5:31 | 9:37 | Price | Offers.doc |
| | | | Sizes | Pants Specifications.doc |
| Couch | 5:40 | 8:10 | Price<br>Available Colors | Furniture brochure.pdf |
| Laptop | 5:40 | 8:10 | Brand<br>Specification<br>Price<br>Buy | Laptop Specifications.doc<br>Laptop advertisement.avi<br>http://www.big-jim-laptopstore.com/laptop.htm |
| Pizza | 5:40 | 6:30 | Order | 206-555-8984<br>http://www.johnspizza.com/order |
| Tempest | 7:10 | 7:15 | Artist | /Bob Dylan.html<br>http://www.buymp3.com/Tempest |

*FIG. 3B*

SYSTEMS AND METHODS FOR SUPPLEMENTING CONTENT WITH AUDIENCE-REQUESTED INFORMATION

BACKGROUND

An advertisement is effective when an audience heed's its message. The audience may be encouraged to take action or consider an idea. And if the message is persuasive enough, the audience acts as the advertiser desires it to.

Much of the effectiveness of an advertisement lies in its ability to convey information. On radio and television, for example, advertisements for products are played during breaks in programming or included in the programming itself, such as by product placement. And online, advertisements are displayed adjacent to a web page's content or as part of it. These advertisements may convey information by telling a story or offering an opinion or a fact. Through the presentation of its message, advertisers hope to communicate the right information to persuade its audiences to follow a desired course of action.

But often an advertisement is unpersuasive despite conveying information about a topic that interests an audience. One common reason for this is that the audience did not learn information relevant to its interests. Some types of advertisements provide avenues for an audience to learn more about a topic. For example, a person actively consuming media content by browsing web pages can select a hyperlink displayed on a website to learn more information about an advertised topic. But when media is consumed more passively, such as through television or radio, a consumer wishing to learn more must either follow directions included as part of the advertisement or search for more information autonomously. Doing so is generally cumbersome or inconvenient, thus reducing the likelihood that the person follows up on the advertisement and is ultimately persuaded. As a result, many advertisers fail to persuade audiences that would likely be receptive toward its message.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 3B is a data structure or table of representative media metadata.

DETAILED DESCRIPTION

A content supplementation system will now be described below, which delivers information to a member of an audience in response to an audience member's expressed interest in receiving information pertaining to a topic. For example, the content supplementation system can use a microphone to listen to a person as he watches a movie on a home theatre. The content supplementation system listens for questions or comments about items displayed during the movie. If it determines that the person has asked a question about a displayed item, it sends information to the person that relates to the question. For example, the person may ask what the price of a car is that is driven by a character in the movie. The content supplementation system can identify the car that the person is referring to and send an email to the person including information about the car, such as its price and local dealers selling that car. The content supplementation system may receive audience input via a mobile device associated with a member of an audience. For example, the content supplementation system may receive a touch or voice input from a smartphone that has a touchscreen interface, including input via a virtual keyboard or input by other input modes (e.g., gesture input).

The content supplementation system provides new ways for advertisers to persuade an audience. It makes product placement an interactive experience. For example, it enables an audience member to simply speak a question about an item in a movie or show and receive information responsive to the question. As a result, advertisers can learn about a person's true interests with respect to media content and supply pertinent information.

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Suitable Environments

Figure 1:
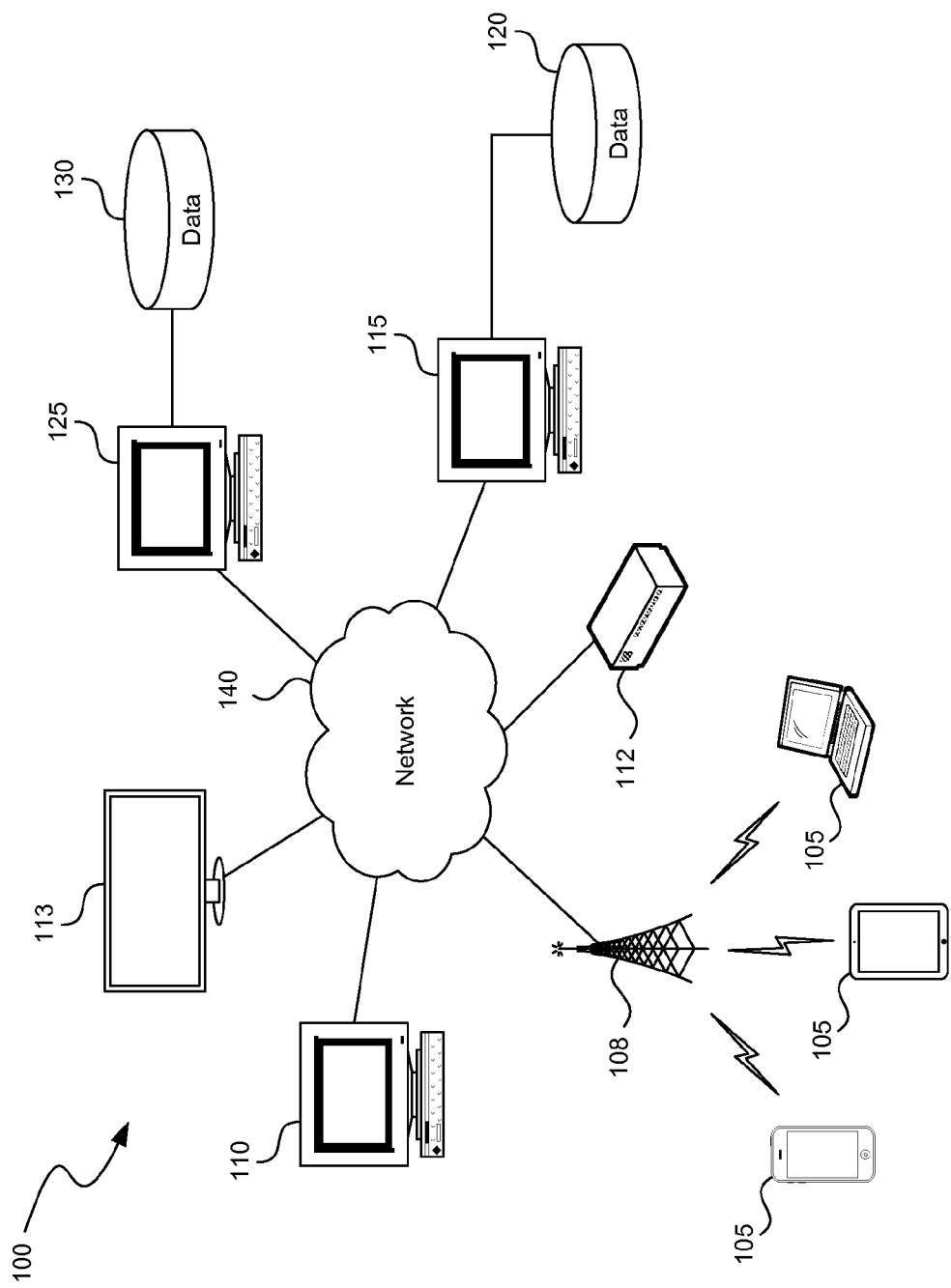
FIG. 1 is a diagram of a suitable environment in which a content supplementation system operates.

FIG. 1 and the following discussion provide a brief, general description of a suitable computing environment 100 in which a content supplementation system can be implemented. Although not required, aspects and implementations of the invention will be described in the general context of computer-executable instructions, such as routines executed by a general-purpose computer or a mobile device, e.g., a personal computer or smartphone. Those skilled in the relevant art will appreciate that the invention can be practiced with other computer system configurations, including Internet appliances, set-top boxes, televisions, hand-held devices, wearable computers, vehicle computer systems, radios, household appliances (especially ones connected to the Internet), gaming consoles, mobile phones, laptops, netbooks, tablets, multiprocessor systems, microprocessor-based systems, minicomputers, mainframe computers, or the like. The invention can be embodied in a special purpose computer or data processor that is specifically programmed, configured, or constructed to perform one or more of the computer-executable instructions explained in detail below. Indeed, the terms "computer" and "computing device," as used generally herein, refer to devices that have a processor and non-transitory memory, like any of the above devices, as well as any data processor or any device capable of communicating with a network, including consumer electronic goods such as gaming devices, cameras, or other electronics having a data processor and other components, e.g., network communication circuitry. Data processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical-based disks, flash memory devices, or any other type of non-volatile storage medium or non-transitory medium for data. Software may include one or more program modules, which include routines, programs, objects, components, data structures, and so on that perform particular tasks or implement particular abstract data types.

The invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described below may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to the example of FIG. 1, a content supplementation system operates in or among one or more computing devices, such as mobile devices 105, computer 110, set-top box 112, television 113, or server 115. The computing device may be deployed in vehicles or other environments. For example, a vehicle radio may include a computing system that listens to the driver and delivers information response to the driver's questions about radio content. The mobile devices 105, computer 110, set-top box 112, and television 113 include a network card or radio or another device that enables them to communicate through one or more networks 140, and include a microphone and speakers. The mobile devices 105, computer 110, appliance 112, and television 113 communicate via the network 140 with a server 115. A data storage area 120 coupled to the server 115 contains data pertaining to the content supplementation system, and software necessary to perform functions of these systems. For example, the data storage area 120 may contain data pertaining to media content (e.g., media metadata) and supplemental information associated with the media content. The data storage area 120 may also contain data pertaining to systems and services utilized by the content supplementation system, such as data pertaining to text-to-speech systems, speech recognition systems, and the like. The content supplementation system may communicate with one or more third party servers 125, which are coupled to data storage areas 130. Third party servers 125 and server 115 may share media content, content metadata, user data, and the like, with the content supplementation system. The content supplementation system may store in the data storage area 120 user data and data extracted as a result of an audience's input to the content supplementation system.

The mobile devices 105, computer 110, set-top box 112, and television 113 communicate with each other and the server 115 and third party server 125 through the networks 140, including, for example, the Internet. The mobile device 105 communicates wirelessly with a base station or access point 108 using a wireless mobile telephone standard, such as the Global System for Mobile Communications (GSM, or later variants such as 3G or 4G), or another wireless standard, such as IEEE 802.11, and the base station or access point 108 communicates with the server 115 and third party server 125 via the networks 140. The computer 110, appliance 112, and television 113 communicate through the networks 140 using, for example, TCP/IP protocols. The mobile devices 105, computer 110, set-top box 112, and television 113 may also communicate with one another over a short-range wireless standard, such as Bluetooth.

Content Supplementation Systems

Figure 2:
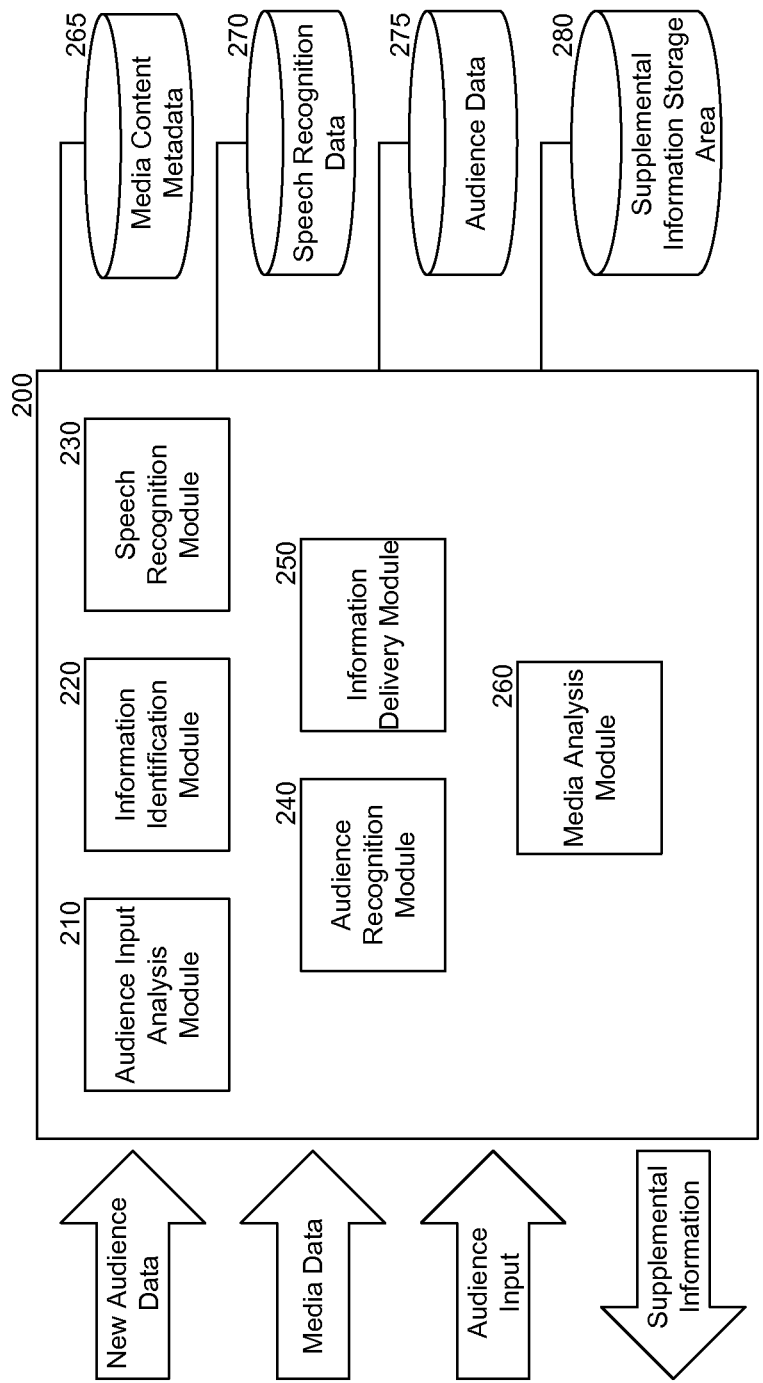
FIG. 2 is a block diagram of the content supplementation system.

FIG. 2 is a block diagram of various modules of a content supplementation system 200. The content supplementation system 200 delivers supplemental information to a member of an audience. The supplemental information is responsive to an input, such as question or a request, received from the audience during or after a presentation of media content. The presented media content can be music, radio, a movie, a television show, a television commercial, a radio commercial, a video game (on a console, computer, mobile device, etc.), online video, streaming audio, a banner advertisement, a kiosk, and so on.

The content supplementation system is configurable for many environments. It can be deployed in a server computer, like the server 125, or another device, such as the mobile devices 105, computer 110, set-top box 112, television 113, or it may be distributed among one or more devices and a server or among multiple devices in a peer-to-peer arrangement. The content supplementation system 200 includes an audience input analysis module 210, an information identification module 220, a speech recognition module 230, an audience recognition module 240, an information delivery module 250, and a media analysis module 260. The content supplementation system 200 accesses and/or stores data in media content metadata storage area 265, speech recognition data storage area 270, audience data storage area 275, and supplemental information storage area 280. Each of these components is discussed in further detail below after a description of the data that that the system receives and transmits.

The content supplementation system 200 receives new audience data, media data, and audience input, and it outputs supplemental information to be delivered to a member of the audience. New audience data describes the audience and the environment in which media is being presented to the audience. New audience data is used by the content supplementation system for a variety of purposes, such as for identifying a member of the audience in order to deliver supplemental information targeted specifically to that member of the audience. New audience data is also useful for determining how to deliver supplemental information to the audience. For example, new audience data can include an address associated with a person, such as a home address or email address. It can also include information related to a mobile device carried by a member of the audience, such as an identifier for the mobile device (e.g., a phone number), or information describing a device used to present media content to the user, such as information describing an operating system of the device. New audience data can also include information describing the audience, such as biometric information. Biometric information can be captured, for example, using facial imaging technology, infrared sensors, and the like.

New audience data comes from many sources. In some implementations, a device in which the content supplementation system is deployed gathers new audience data using a radio antenna, microphone, camera, and so forth. In some implementations the content supplementation system receives new audience data from remote sources, such as a server computer. In some implementations, new audience data is received from a device associated with a member of an audience, communicated via a wireless standard, such as Bluetooth, WiFi, or Near Field Communication (NFC).

Media data describes both the media content that is presented to an audience and the presentation itself. It includes data defining the media content, such as video data of a television show. It also includes playback information related to the media, such timing data related to the playback of a movie. Media data also includes metadata associated with the media. In some implementations, the media data includes a log that describes where or when content elements appear in a media item. The content supplementation system 200 uses media data for a number of reasons, including for interpreting an audience's input and for determining how to deliver supplemental information to a member of the audience. As discussed below, in some implementations, the media data is processed by the media analysis module 260 to create metadata associated with the media.

Audience input includes data representing an input from an audience member. Audience input is received during or after the presentation of media content. In some implementations, audience input includes audio data representing words spoken by an audience member and/or a transcript of the spoken words. For example, a microphone of a device, such as a mobile device or a video game console, can record and transmit to the content supplementation system 200 a recording of words spoken by the audience. In some implementations, audience input includes information submitted by an audience member into a device. The content supplementation system can also receive either raw or processed audience input from another device that captures the audience input. For example, deployed in a television, the content supplementation system may receive audio data from a mobile device associated with an audience member. Audience input also includes information derived from audience input. For example, the content supplementation system may process audio data recorded of an audience member to identify a tone, a pitch, a rate, a volume, a speaking style, or another voice component that is associated with spoken words from the audio data.

Supplemental information includes information that the content supplementation system generates or identifies that is to be delivered to an audience member. Supplemental information may include text, audio, video, pictures, statistics, a link to a file stored in a server computer, and the like. In some implementations, the content supplementation system delivers supplemental content to a device being used to consume media content. For example, the content supplementation system can send supplemental information to a television on which a person is watching a sitcom (e.g., as in a displayed informational window). In some implementations, supplemental information is delivered to a different device than the device being used to present media content to an audience member. For example, the content supplementations system can send supplemental information to a person's mobile device while he is watching television (e.g., as a text massage, email, or voicemail). The content supplementation system 200 delivers supplemental information while media is being presented to the audience or afterwards.

Figure 3A:
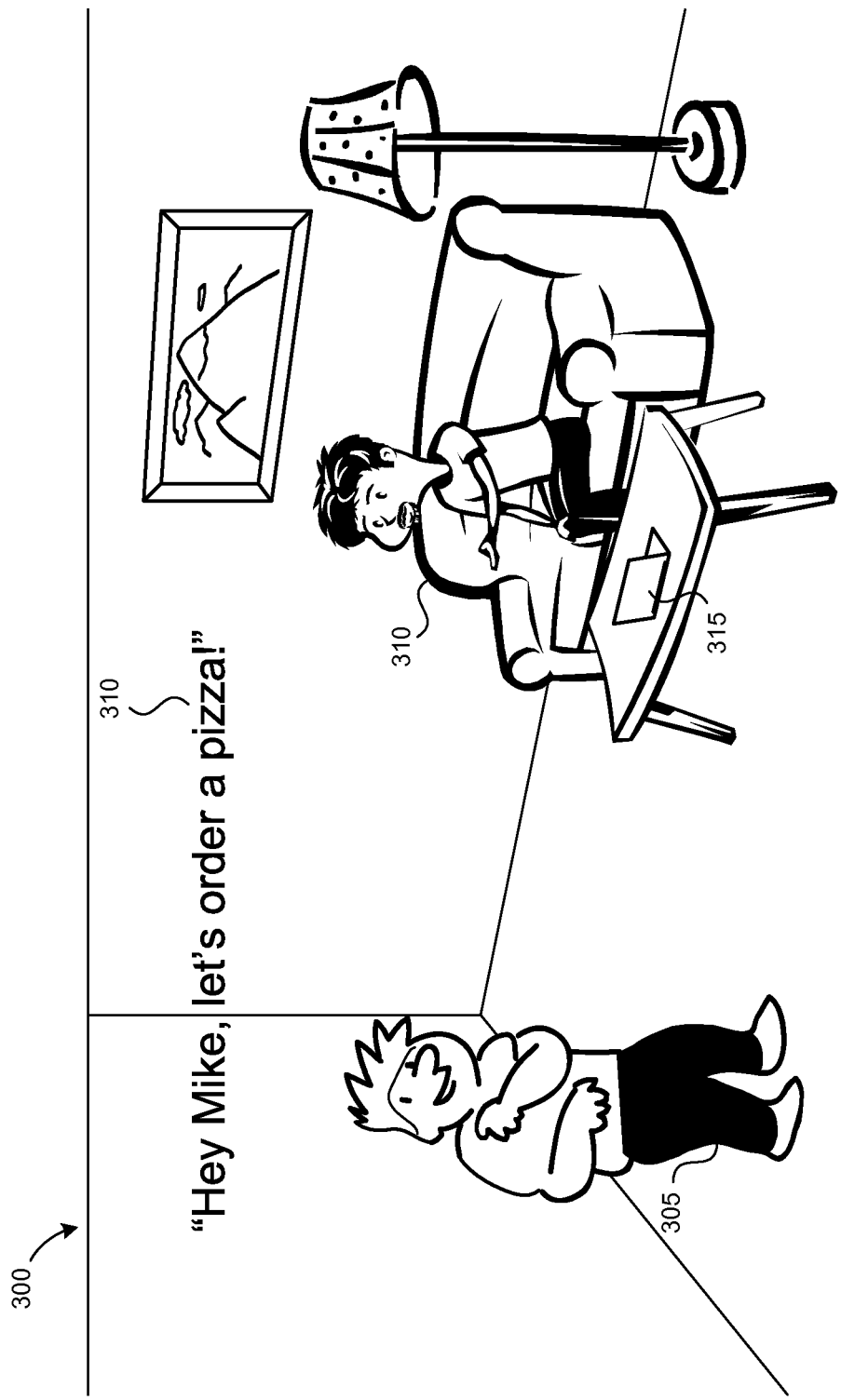
FIG. 3A is an example of media content including content elements that a member of an audience may inquire about in order to receive supplemental information.

The audience input analysis module 210 examines audience input to determine whether supplemental information should be delivered to the audience. One way that it makes this determination is by comparing audience input to active "content elements" in the media content and to "intents" associated with those content elements. A content element in presented media includes a visual object, a sound, a spoken word, a graphic, an idea, an image, or the like, that is displayed, played, referenced, or otherwise presented to an audience as part of media content. For example, FIG. 3A depicts media content 300 of a scene from a movie that includes various content elements, including pants 305, a couch 310, and a laptop 315 (all as displayed data from the media content), and reference to a pizza 320 (in audio data from the media content). The hat, couch, and laptop are each content elements that are visually displayed. The pizza is an audible content element, spoken by one of the characters in the scene.

An intent represents what an audience member is anticipated to intend if the person provides input regarding a content element. FIG. 3B shows media metadata associated with the media content 300 from FIG. 3A, organized in a table 330 that includes content elements 335 and associated intents 341. For example, two intents associated with the pants 305 content element are "price" and "sizes." If an audience member watching the scene asks a question or makes a statement concerning the pants and its price, for example, the content supplementation system determines that the person has referenced the pants content element and the price intent. As discussed further below, the content supplementation system uses an intent about a content element for providing supplemental information to a person.

The audience input analysis module 210 determines whether a content element and an associated intent are referenced by comparing audience input to media metadata. In some implementations, the audience input analysis module determines that a content element is referred to when audience input relates to the content element. If, for example, a word spoken by the person matches a content element name, or if the spoken word is similar in meaning or associated with the content element name in a predetermined way, the audience input analysis module 210 concludes that the content element was identified by the audience's input. The audience input analysis module may determine whether a content element is referenced to in other ways and may consider additional information, such as a gender or age of the audience. In some implementations, the audience input analysis module uses natural language processing techniques and/or text analytics to compare audience input and media metadata. In some implementations, the audience input analysis module considers a pitch, tone, or other voice component associated with an audience input to determine whether an intent is referenced. For example, the audience input analysis module may compare a tone of a user's voice to a stored tone associated with the user to determine that the user is urgently interested in a particular object. Accordingly, in some implementations, intents associated with a content element are associated with a voice component of a verbal audience input. Indeed, a content element may be associated with an urgent intent, a sarcastic intent, and so forth.

A content element may appear in presented media in a limited capacity or for a limited time frame. In some implementations, the content element is made active for certain time periods, such as when it is being presented and shortly thereafter. Alternatively, a content element is always active when media content is being presented and thereafter. And sometimes a content element is only active for a portion of the time that content is presented. Referring again to FIG. 3B, each content element 335 in the table 330 is associated with an active start time 337 and an active stop time 339. For example, the pants content element is active between times 5:31-9:37 in the media content. In some implementations, the audience is provided an indication that a content element is active when it is active. For example, a television may display an overlay naming an active content element on a corner of the display during the presentation of media content in order to indicate to the audience that the content element is active.

The audience input analysis module receives audience input directly from a device that captures the input or from another system or module. For example, the audience input analysis module may receive text from the speech recognition module 230. The audience input analysis module also may receive data from the audience recognition module 240 that includes information identifying the audience. It also may receive data from the media analysis module 260, including media metadata. In some implementations, the audience input analysis module considers some of this additional information when identifying content elements and intents associated with an audience's input.

The information identification module 220 identifies supplemental information to deliver to the audience. The supplemental information is stored in supplemental information storage area 280. In some implementations, the supplemental information that is identified is associated with a content element and an intent referenced by an audience. For example, referring again to FIG. 3B, if an person viewing the media content 300 asks, "How much do those awesome pants cost that Mike is wearing?" the information identification module identifies Offers.doc because the pants content element and the price intent were referenced and Offers.doc is associated with the price intent of the pants content element. In some implementations, the information identification module identifies supplemental information based at least in part on a voice component associated with audio data recorded of the audience. For example, the information identification module may determine that a viewer has asked, "Where did Mike find those pants? They look like Hammer pants on his skinny legs." By comparing a tone and pitch of the viewer's voice with logged data from previous audio recordings of the user, or between words in the recording, the information identification module may identify that the viewer has asked with sarcasm where Mike found his pants. Consequently, the information identification module may identify supplemental information associated with a sarcastic audience intent related to a content element.

The information identification module can identify supplemental information that is responsive to the audience's input based on available data about the audience or the input from the audience. Alternatively or additionally, supplemental information is predefined. For example, an advertiser may create supplemental information to be delivered to an audience when a content element is referenced by the audience. In other implementations, supplemental information is modified based on user input, user information, a time, a date, demographic information, a location of the audience, the device that is to receive the supplemental information, the address that the supplemental information is to be delivered to, an audience preference, or based on other information. For example, for the sizes intent associated with the pants content element, the information identification module may remove children's sizes when the audience member requesting size information is an adult. As another example, if media content is a rerun showing a dated version of a car, the content supplementation system may identify information related to a current version of the car that it can deliver to an audience member who references the car.

The speech recognition module 230 receives audio data and generates a transcription of spoken words represented by the audio data. The audience input that is received by the content supplementation system may include audio data representing words spoken by the audience and captured by a microphone. The speech recognition module 230 utilizes a speech recognition application, such as Dragon, which is sold by Nuance Communications, Inc. The speech recognition module 230 accesses data stored in the speech recognition data storage area 270, which it uses to identify spoken words from audio recordings. The speech recognition module 230 also analyzes received audio data to identify information pertaining to the audience and a voice component associated with the audio (e.g., pitch). For example, the speech recognition module can utilize gender or age analysis techniques in order to identify a sex or age of a member of an audience.

The audience recognition module 240 identifies information associated with an audience. The information associated with the audience may be used by the audience input analysis module 210 or information identification module 220 for identifying intents and content elements or to identify or generate supplemental information to be delivered to an audience. This information may also be utilized by the information delivery module in order to determine how supplemental information should be delivered to an audience. The audience recognition module 240 identifies audience information in new audience data that is received by the content supplementation system. The new audience data may include identifying information associated with the audience, such as an IP address, a username, an account number, environmental information (e.g., a location of the audience, noise information pertaining to the audience's environment, computer usage information, etc.), and so forth. The audience recognition module 240 may search for stored audience data that is associated with the new audience data. The audience data storage area 275 may contain the stored audience data. Stored audience data may include, for example, interests or data related to advertisements that the audience previously viewed or content elements or intents that the audience expressed interest in. The content supplementation system 200 is configured to identify advertisements and responses that are likely to be relevant to the audience based on the information known about the audience. When new audience data is received, the audience recognition module 240 stores the new audience data in audience data storage area 275. The audience data storage area 275 may also store other data relevant to advertising, such as demographic data, survey responses, Internet cookies and ad logs that track individual audience member's interactions with online content, etc.

The information deliver module 250 determines how supplemental information should be delivered to an audience member. The information delivery module may consider new audience data, media data and metadata, audience input, audience data contained in data storage area 275, and other information about an environment in which the audience may wish to receive the data, such as noise or audio information near the audience, a GPS location of a user, or an audience member's preferred mode of receiving supplemental information. In some implementations, the delivery method is determined based in part on the media that is being presented to an audience. For example, if an audience is watching a television sitcom that has commercial breaks, the information delivery module may transmit supplemental information to the television to appear during the commercial breaks. But if the audience is watching a movie, the information delivery module may decide to send the audience member a short message service (SMS) message with a link to a network location at which the person can view supplemental information.

In some implementations, the delivery method is determined based in part on how the audience consumes the presented media. For example, if the audience is viewing a movie on a tablet computer, the information delivery module can cause a text string of supplemental information to appear at the bottom of the screen. In some implementations, information is delivered to an audience member by directing a device associated with the audience member to a web page where the person can complete a purchase. In some implementations, supplemental information is delivered via a social networking platform.

The media analysis module 260 maintains media metadata associated with media content being presented to an audience. In some implementations the media analysis module analyzes media data and existing media metadata in order to generate additional media metadata, such as information related to content elements and intents. As discussed above, in some implementations, media metadata is predefined and delivered to the content supplementation system. For example, an advertiser showcasing a product in media content via product placement may supply media metadata indicating that the product is a content element when it appears on screen and that an intent associated with that content element be a buy intent (the advertiser may also supply supplemental information that is associated with the buy intent). In some implementations, content elements and/or intents are automatically created by the media analysis module. The media analysis module may utilize natural language processing techniques to identify content elements. For example, the media analysis module may search through a transcript associated with audio data for keywords or ideas. When, for example, a keyword like "pizza" is found, the media analysis module may create metadata corresponding to a pizza content element that is to be active during a time period that pizza is discussed in the media content. The media analysis module may also automatically identify supplemental information associated with an identified intent and content element. For example, if pizza were an identified content element, supplemental information may include a phone number of a local pizza restaurant. The media analysis module may store generated metadata in media content metadata storage area 265.

Suitable Processes

Figure 4:
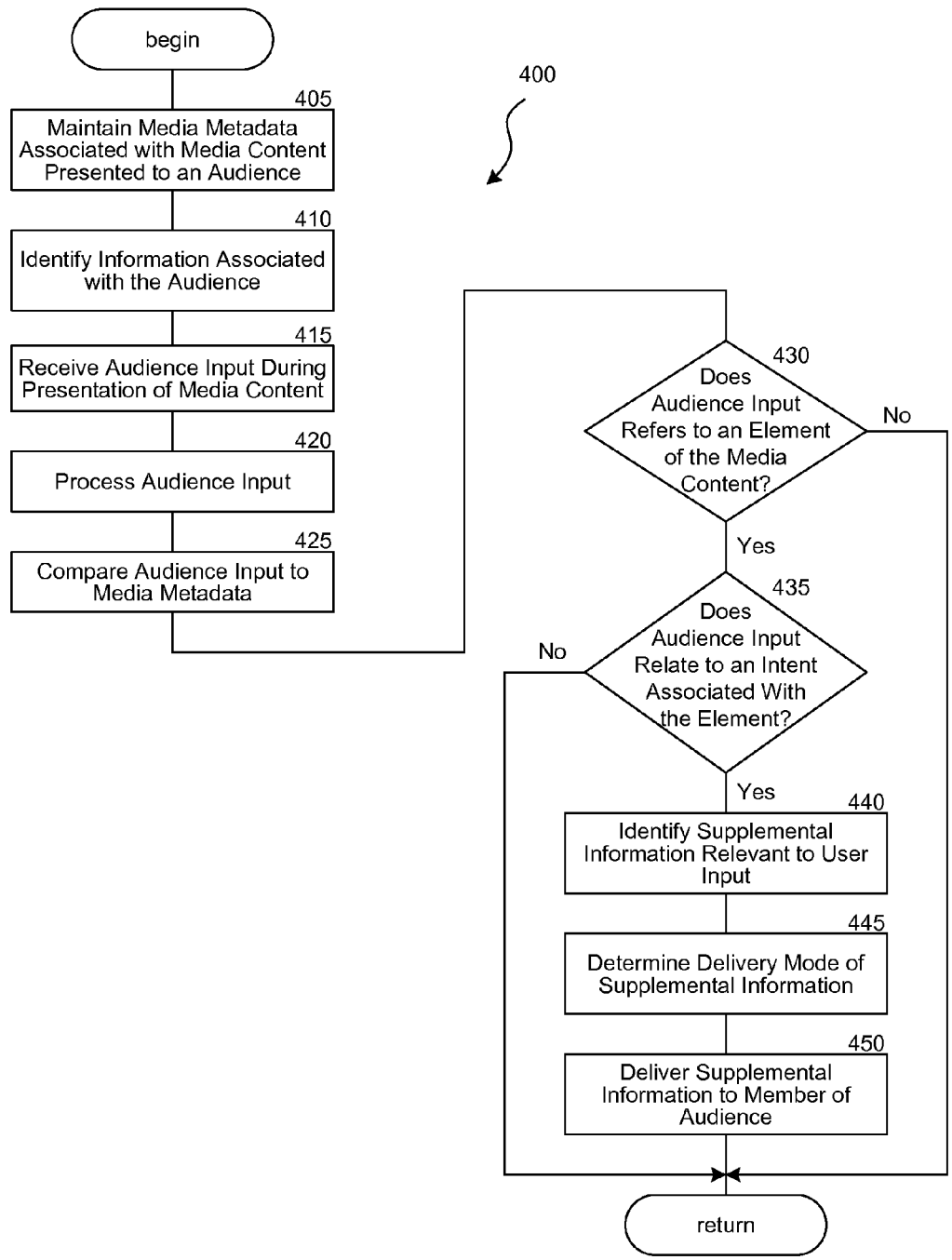
FIG. 4 is a flow diagram depicting a method performed by the content supplementation system for delivering supplemental information to a member of an audience.

One application for the content supplementation system 200 is for delivering supplemental information to a member of an audience being presented media content. FIG. 4 is a flow diagram of a process 400 implemented by the content supplementation system 200 for delivering supplemental information to an audience member. At a block 405, the content supplementation system 200 maintains media metadata associated with media content presented to an audience. The media content may be a video, an image, audio, text, an animation, or the like, representing a movie, a television show, a radio show, a podcast, music, an advertisement, etc. The media content may be presented using a television, computer, mobile device (e.g., smartphone, tablet computer, etc.), radio, kiosk, or the like. Media metadata describes the media content. In some implementations, media metadata is received from a third party, such as a creator of media content or from media distributors (e.g., cable television providers, websites, etc.). In other implementations, media metadata is received from a device or system that presents the media content. As discussed above, the content supplementation system can also generate media metadata by analyzing media content.

Media metadata includes information about the media, including data related to content elements of the media and associated intents. Media metadata also defines time periods that content elements are active during playback of media content, when applicable. For example, media metadata may specify that each content element is active from when it is referenced or appears in the media content and for two minutes thereafter. In some implementations, media metadata includes a description of questions or statements that a member of an audience can make that will be recognized as corresponding to an intent of a content element.

At a block 410, the content supplementation system identifies information associated with the audience. This information may include an identifier for a mobile device carried by a person, a username associated with an account of a person, an address or phone number associated with an audience member, biometric information describing an audience member, a quantity of people in an audience, demographic information related to an audience member or the audience as a whole, and so forth. In some implementations, audience data may be identified during the presentation of media content. For example, information associated with an audience may be transmitted from a device associated with a person to the content supplementation system (e.g., a mobile device) while media content is being presented. In some implementations, information associated with the audience is measured or sensed using a device or sensor and transmitted to the content supplementation system. For example, a camera may capture an image of the audience that the content supplementation system can perform facial recognition analysis on to identify an audience member or characteristics about the audience member. Alternatively or additionally, the system can capture via a microphone spoken audio input from a user and use audio analysis to identify the specific user. In some implementations, audience data includes data that was collected previously by the content supplementation system, such as previously logged audio data.

At a block 415, the content supplementation system 200 receives audience input during or after the presentation of the media content. In some implementations, the received input includes audio data of words spoken by the audience. Alternatively or additionally, the received input includes information submitted by a user into a device, such as a mobile device. For example, the user may select to receive supplemental information about media content via a touchscreen interface and an application operating on a smartphone. Alternatively, the user may speak a question into the smartphone. In some implementations, the content supplementations system 200 inserts into a presentation of media content an indication that a content element is active. For example, the content supplementation system may insert an image overlay on a corner of television screen during playback of a show, which welcomes the audience to inquire about a content element.

At a block 420, the content supplementation system processes the audience input. When the audience input includes audio data, the content supplementation system may process the audio data using speech recognition technology to convert spoken words from audio data to text representing the audience input. The content supplementation system may also process the audio data to identify voice components associated with the words spoken by the audience, such as the speaker's tone of voice. The content supplementation system also processes audience input to identify information associated with the audience. For example, the content supplementation system may use voice analytics to identify an age, gender, and/or identity of a person based on audio data of audience input.

After the audience input is processed, at a block 425, the content supplementation system 200 compares processed audience input to media metadata. Through this comparison, the content supplementation system determines whether the audience member desires to receive supplemental information relating to a content element and whether it has access to or can generate supplemental information relevant to the audience input. At a decision block 430, the content supplementation system determines whether the audience input refers to an active content element of the media content. In some implementations, the content supplementation system compares text representing an audience's input with content elements in media content that are active when the audience input is received. And if the audience input includes a name of a content element or a word that is synonymous with the content element, the content supplementation system determines that the content element was referenced. In some implementations, media metadata specifies when during a presentation of media content a content element is active, which the content specification system compares to a timer or clock associated with the presentation of the media content. In some implementations, the content supplementation system uses natural language processing techniques for determining whether audience input references an active content element.

The content supplementation system also considers other information when comparing audience input with media metadata. In some implementations, content element metadata is used in determining whether a content element has been referenced. For example, audience input may be compared with keywords and anticipated questions associated with a content element. In some implementations, the content supplementation system considers demographic data or other information associated with an audience in determining whether audience input references a content element.

The content supplementation system can also recognize content elements in media content based on audience input. In some implementations, the content supplementation system 200 stores a record associated with audience input received during the presentation of media content. For example, it may store in a server every word spoken by an audience and a time that each word is spoken during a media presentation. And if during multiple presentations of media content a word is spoken or referred to by an audience, the content supplementation system recognizes that word as a content element. For example, if the word "Tempest" is spoken during multiple presentations of a television show, the content supplementation system may recognize "Tempest" as a content element. Additionally, the content supplementation system may distinguish a recognized content element from irrelevant information that shares some similarities with a recognized content element. For example, "Tempest" is the name of a play written by William Shakespeare, but it is also the name of an album composed by Bob Dylan. The content supplementation system can reconcile ambiguities associated with a recognized content element. For example, the content supplementation system may determine that the content element "Tempest" refers to the album by Bob Dylan and not the play by William Shakespeare because Bob Dylan's album was released more recently than William Shakespeare's play. The content supplementation system may update the table 300 to reflect the recognition of a content element (e.g., by adding data associated with the recognized content element "Tempest").

If the content supplementation system 200 determines that the audience input does not refer to an active content element of the media content, the process 400 returns. But if it does refer to an active content element, the process proceeds to a decision block 435, and the content supplementation system determines whether the audience input relates to an intent associated with the active content element. This determination is made by comparing audience input to intents and intent metadata. When the content supplementation system successfully matches an audience input to an intent, it is able to identify supplemental information to deliver to the audience that is contextually relevant and appropriate based on the audience input.

The content supplementation system determines whether audience input relates to an intent by comparing the audience input to intents and intent metadata. In some implementations, this comparison is made between words from audience input and intents. The comparison may also be made with phrases and words that are similar in meaning to the words of the audience input, and with media metadata, such as intent metadata that describes the intent and includes synonyms and examples audience inputs that would match the intent. In some implementations, the content supplementation system uses natural language processing technology to help make the comparison. In some implementations, the content supplementation system does not first identify a content element that was referred to before identifying an intent. For example, in some applications, the system compares intents associated with all active content elements with audience input and related data.

Sometimes, despite having found that audience input refers to an active content element, the content supplementation system finds no related intent. When no intent is found, the process 400 returns. In some implementations, however, the content supplementation system instead sends default supplemental information to the audience member if no intent is identified. If an intent is identified, the process 400 proceeds to a block 440, and the content supplementation system identifies and/or generates supplemental information that is relevant to the user input.

Relevant supplemental information can be identified in a number of ways. In some implementations, supplemental information is associated with an intent, and when the intent is identified as being related at block 435, the associated supplemental information is identified as being relevant to the audience input. In some implementations, the content supplementation system identifies relevant supplemental information using audience information, such as a sex of an audience member or demographic information associated with the audience. For example, if an audience member is female, the content supplementation system can select supplemental information that is relevant to the user but that is tailored to women. In some implementations, the content supplementation system modifies or generates at least some of the supplemental information based on user input, media metadata, or media playback information. It can also modify content information based on how the supplemental information is delivered to the audience.

At a block 445, the content supplementation system determines a mode by which the identified supplemental information is to be delivered to the audience member. There are many different ways for the content supplementation system to deliver supplemental information to a member of an audience. It may send supplemental information to a device that the audience is consuming media content through. For example, supplemental information may be presented as text that is displayed simultaneously with media content or during a break in the presentation of the media content. In some implementations, the content supplementation system pauses the presentation of media content in order to present supplemental information. The content supplementation system may also send supplemental information to an account or address associated with the audience member. For example, supplemental information may be sent in an email or short message service (SMS) message. In some implementations, the supplemental information is transmitted to an application running on a mobile device associated with an audience member.

The content supplementation system may select a mode of communication based on an audience preference. For example, an audience member may toggle a setting that specifies that the audience member wishes to receive supplemental information in email. An audience preference may also be communicated to the content supplementation system via audience input. For example, an audience member reacting to a content element of media content may state aloud, "Send me an email with more information regarding the specifications of that couch." In some implementations, the content supplementation system selects a mode of communication based on the content of supplemental information or the format for which it is designed to be presented. For example, supplemental information may include video data. The content supplementation system may determine that the best mode to deliver the supplemental information is via a television that is presenting media content because that is the only available option for presenting video to the audience member. The content supplementation system may also interface with a digital video recorder (DVR) to communicate supplemental information. For example, the content supplementation system may instruct the DVR to pause a show or a program, and the content supplementation system may stream video to a television via the DVR through a network connection. The DVR may then resume regular programming after the supplemental information is presented.

At a block 450, the content supplementation system delivers the supplemental information to the audience using the identified mode of communication. The content supplementation system may modify the formatting or content of the supplemental information based on the mode of communication chosen. Furthermore, the content supplementation system may modify supplemental information so that it is targeted to an audience member. For example, the content supplementation system may add a name of an audience member to the supplemental information.

Figure 5:
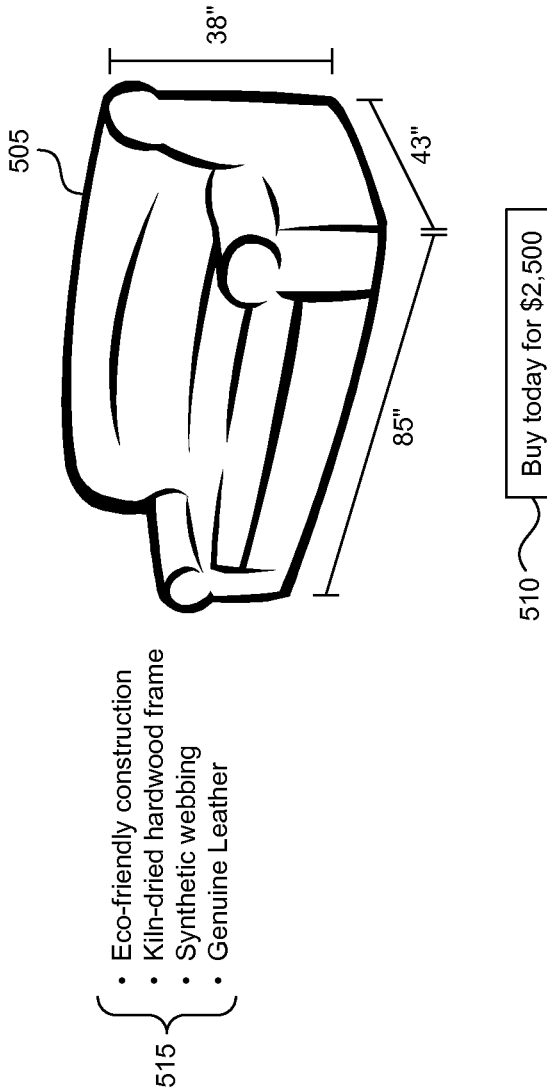
FIG. 5 is an example of supplemental information deliverable by the content supplementation system.

FIG. 5 is an example of supplemental information 500 that may be delivered to a member of an audience. The supplemental information 500 describes the specifications of a couch. As an example, it may be delivered to an audience of the media content 300 of FIG. 3A in response to an audience question, "How much does that couch cost?" The supplemental information includes an image 505 of the couch and its dimensions, information 515 about the couch, and a text box 510 specifying the price of the couch, which may be selectable by the audience for purchasing the couch. If the supplemental information 500 is delivered to an audience using a mode that permits audience input after the supplemental information is delivered, the text box 510 is an active content element of the supplemental information. If the mode does not permit audience input after delivery, then the supplemental information is delivered without the text box 510 being an active content element.

CONCLUSION

Those skilled in the art will appreciate that the actual implementation of a data storage area may take a variety of forms, and the phrase "data storage area" is used herein in the generic sense to refer to any area that allows data to be stored in a structured and accessible fashion using such applications or constructs as databases, tables, linked lists, arrays, and so on. Those skilled in the art will further appreciate that the depicted flow charts may be altered in a variety of ways. For example, the order of the blocks may be rearranged, blocks may be performed in parallel, blocks may be omitted, or other blocks may be included.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more content elements; the coupling or connection between the content elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The content elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, and the assignee's U.S. patent application Ser. No. 13/597,017, filed Aug. 28, 2012, and Ser. No. 13/583, 840, filed Sep. 10, 2012, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A tangible computer-readable storage medium containing instructions for performing a method of delivering information associated with media content being consumed by a member of an audience, the method comprising:
    maintaining or accessing media metadata associated with media content being presented to an audience;
    receiving audience input received from a member of the audience during the presentation of the media content to the audience and while a content element is being presented;
    identifying audience information describing the member of the audience;
    comparing the received audience input to the media metadata,
        wherein the media metadata describes the content element of the media content being presented to the audience,
        wherein the content element is associated with content presented to the audience perceiving the media content,
        wherein the media metadata includes at least two intents associated with the content element of the media content being presented to the audience, and
        wherein the intents are associated with anticipated inputs by the audience in reference to the content element;
    determining, based at least in part on the comparison, that the received audience input refers to the content element of the media content;
    identifying, based at least in part on the comparison, an intent of the at least two intents,
        wherein the identified intent is related to the audience input,
    identifying supplemental information to deliver to the audience member, wherein the supplemental information is identified based at least in part on the identified intent, the identified audience information, and the content element that the audience input is determined to refer to; and
    delivering the supplemental information to the member of the audience.

2. The computer-readable storage medium of claim 1, wherein the audience input includes audio data representing a verbal input by the audience member, and wherein the method further comprises identifying spoken words from the audio data representing the verbal input of the audience member.

3. The computer-readable storage medium of claim 1, wherein the audience input includes audio data representing a verbal input by the audience member, and wherein identifying the audience information comprises:
    identifying spoken words from the audio data representing the verbal input of the audience member; and
    identifying a gender of the audience member based on an analysis of the audio data,
    wherein the supplemental information is identified based at least in part on the gender of the audience.

4. The computer-readable storage medium of claim 1, wherein identifying the intent of the at least two intents includes identifying in the audience input a spoken word that is associated with intent metadata.

5. The computer-readable storage medium of claim 1, wherein:
    the content element is active for a limited period of time during the presentation of the content element, and
    the audience input is received during the limited period of time.

6. The computer-readable storage medium of claim 1, wherein maintaining media metadata associated with media content being presented to the audience includes:
    analyzing the media content;
    identifying content elements in the media content that are to be presented to the audience;
    associating at least one intent with each of the content elements identified in the media content;
    identifying supplemental information associated with the content elements in the media content; and
    storing in a data structure the supplemental information in association with the content elements.

7. The computer-readable storage medium of claim 1, wherein the media content includes at least one of video, audio, and animation provided via cable, television, or radio broadcast.

8. The computer-readable storage medium of claim 1, wherein delivering the supplemental information to the member of the audience includes presenting the supplemental information using a display device being used to present the media content to the audience.

9. The computer-readable storage medium of claim 1, wherein delivering the supplemental information to the member of the audience includes transmitting the supplemental information to a computing device associated with the member of the audience.

10. The computer-readable storage medium of claim 2, further comprising analyzing the audio data to identify a voice component associated with the audience input, wherein the supplemental information identified to deliver to the audience member is based at least in part on the voice component.

11. The computer-readable storage medium of claim 10, wherein the voice component includes at least one of pitch, tone, rate, and volume.

12. A method of delivering information associated with content being consumed by a member of an audience, the method performed by a computing system having at least one processor and memory, the method comprising:
maintaining or accessing media metadata associated with media content being presented to at least one audience member,
wherein the media metadata identifies a content element of the media content;
receiving audio data representing a verbal input from an audience member during the presentation of the media content to the audience and while the content element is being presented;
identifying spoken words from the audio data representing the verbal input of the audience member;
identifying audience information describing the audience member;
comparing the spoken words from the audio data to the content element of the media content;
determining that the spoken words reference the content element;
determining an intent associated with the spoken words;
identifying, based at least in part on the determined intent associated with the spoken words and on the identified audience information, supplemental information to deliver to the audience member,
wherein the supplemental information is associated with the content element;
wherein the supplemental information is identified from among other supplemental information associated with the content element; and
delivering the identified supplemental information to the member of the audience.

13. The method of claim 12, wherein the audience information is identified based at least in part on the audio data, the method further comprising:
modifying the identified supplemental information based on the audience information prior to delivering the identified supplemental information to the member of the audience.

14. The method of claim 12, wherein delivering the identified supplemental information to the member of the audience includes presenting the identified supplemental information to the member of the audience using a display device being used to present the media content to the audience.

15. The method of claim 12, wherein the audio data is recorded using a mobile device associated with the member of the audience.

16. A system including at least one processor and memory for delivering information associated with media content being consumed by a member of an audience, the system comprising:
a media analysis module configured to:
maintain or access media metadata associated with media content being presented to at least one audience member;
an audience input analysis module configured to:
compare audience input representing input from a member of an audience captured during the presentation of the media content and while a content element is being presented to media metadata, wherein:
the media metadata describes the content element of the media content being presented to the audience, and
the content element is associated with content presented to the audience of the media content;
determine, based on the comparison, that the received audience input refers to the content element of the media content; and
determine an intent associated with the received audience input;
an audience recognition module configured to:
identify, based at least in part on the audience input, audience information describing the audience member;
an information identification module configured to:
identify, based at least in part on the determined intent and the identified audience information, supplemental information to deliver to the audience member,
wherein the supplemental information is associated with the audience input and the content element that the audience input refers to, and
wherein the supplemental information is identified from among other supplemental information associated with the content element; and
an information delivery module configured to:
determine a mode by which the supplemental information is to be delivered to the member of the audience; and
deliver the identified supplemental information to the member of the audience via the determined mode.

17. The system of claim 16, wherein the audience input includes audio data representing a verbal input by the audience member, and wherein the system further comprises a speech recognition module configured to identify spoken words from the audio data representing the verbal input of the audience member.

18. The system of claim 16, wherein the audience input includes audio data representing a verbal input by the audience member, and wherein the system further comprises a speech recognition module configured to:
identify spoken words from the audio data representing the verbal input of the audience member; and
identify an age or gender of the audience member based on an analysis of the audio data,
wherein the information identification module is configured to identify the supplemental information based at least in part on the age or gender of the audience member.

19. The system of claim 16, wherein
the content element is active for a limited period of time during the presentation of the media content, and
the audience input is captured during the limited period of time.

20. The system of claim 17, wherein the speech recognition module is further configured to identify a voice component associated with the audience input, wherein the information identification module is further configured to identify supplemental information to deliver to the audience member based at least in part on the voice component.

* * * * *